United States Patent [19]
Jarek et al.

[11] Patent Number: 5,867,619
[45] Date of Patent: Feb. 2, 1999

[54] INTEGRATED OPTICAL WAVEGUIDE COMPONENT AND METHOD OF MANUFACTURE

[75] Inventors: Mathias Jarek, Seligenstadt; Carsten Marheine, Hildesheim; Hans Kragl, Diekholzen, all of Germany

[73] Assignee: Harting Elektro-optische Bauteile GmbH & Co. KG, Bad Salzdetfurth, Germany

[21] Appl. No.: 854,860

[22] Filed: May 12, 1997

[30] Foreign Application Priority Data

May 14, 1996 [DE] Germany ............... 196 19 353.2

[51] Int. Cl.$^6$ .................... G02B 6/26; G02B 6/42
[52] U.S. Cl. .................... 385/52; 385/49; 385/14
[58] Field of Search ............ 385/14, 49, 50–52; 65/386

[56] References Cited

U.S. PATENT DOCUMENTS

| | | | |
|---|---|---|---|
| 4,639,074 | 1/1987 | Murphy ............ | 385/52 |
| 5,123,068 | 6/1992 | Hakuon et al. ............ | 385/14 |
| 5,526,454 | 6/1996 | Mayer ............ | 385/49 |
| 5,528,713 | 6/1996 | Dannoux et al. ............ | 385/49 |
| 5,600,745 | 2/1997 | Wuu et al. ............ | 385/49 |

*Primary Examiner*—Hemang Sanghavi
*Attorney, Agent, or Firm*—Kenyon & Kenyon

[57] ABSTRACT

In a method for manufacturing an integrated, optical waveguide component having fiber couplings, a substrate component and a cover component are used, the cover component being obtained by forming a positive-negative replica of the substrate component. To separate the optical waveguide pattern region from the regions of the fiber couplings, grooves, as well as corresponding webs, are provided transversely to the fiber couplings. The method eliminates the need for carrying out the fiber adjustment and the waveguide formation in one process.

16 Claims, 6 Drawing Sheets

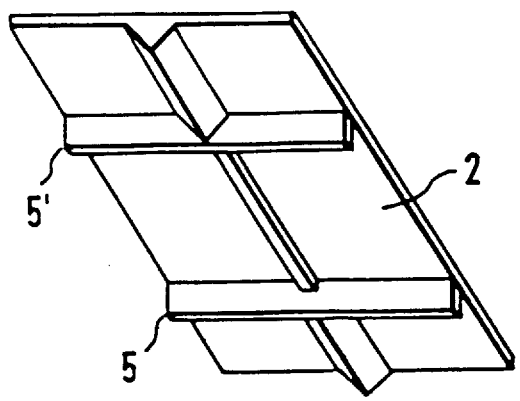
FIG. 4
FIG. 5
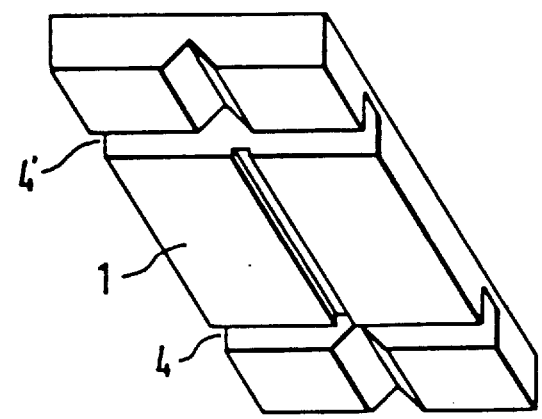
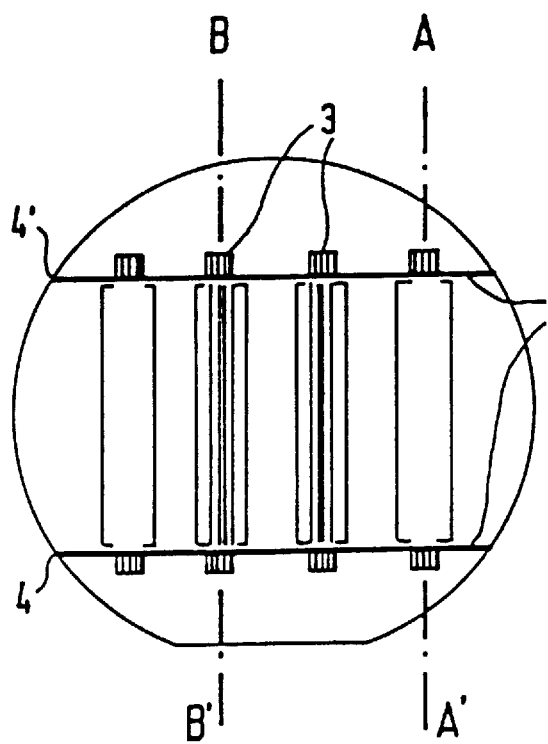
FIG. 6

INTEGRATED OPTICAL WAVEGUIDE COMPONENT AND METHOD OF MANUFACTURE

FIELD OF THE INVENTION

The present invention is directed to an integrated, optical waveguide component having fiber couplings, and a method for manufacturing such a component, where a substrate component having pre-molded patterns and a cover component modeled from the substrate component are used.

BACKGROUND INFORMATION

German Patent Application No. DE 42 17 553 A1 describes a waveguide component having fiber couplings. It comprises a base part of polymeric material and a lid part that is constructed as the negative matrix of the base part. V-guides are provided as fiber-coupling regions at the outer extremities. The mid-section of the base part has a waveguide depression, which is provided with an optically active substance, for example a UV-setting adhesive.

FIG. 1 depicts a similar waveguide component. The fibers to be coupled are pre-aligned (a prealignment fixture). After the core monomer hardens, PMMA cover foils (polymeric cover foils) are glued (polymeric glue) to the substrate exhibiting the same patterns in order to bond the waveguides. For this purpose, a core-monomer adhesive is dripped into the waveguide depressions, squeezed out as a foil less than 1 $\mu$m thick and subsequently cured by means of UV or thermal polymerization. Following polymerization, the refractive index of the core polymer is about $5*10^{-3}$ higher, so that, together with the surrounding polymeric substrate, it constitutes a dielectric waveguide. Foils commercially known under the name Mylar (TM) can be stripped off after the core monomer hardens (strip-off covers). These foils must be cut exactly to length with a precision of about +/-10 $\mu$m. As shown in FIG. 1, the fibers to be coupled are inserted into the V-guides prior to adhesion of the waveguides and are adhesively bonded to the substrate by the overflowing core monomer.

SUMMARY OF THE INVENTION

The method for manufacturing a component according to the present invention eliminates the need existing in the related-art methods to simultaneously carry out the processes of fiber adjustment and waveguide adhesion. The core material at the substrate surface can be pressed out with a thickness of less than 1 $\mu$m, without the passive fiber adjustment being destroyed or disturbed.

In contrast to the above methods, where the front ends of the glass fibers to be coupled are bonded by the same monomer (core monomer) that forms the waveguide cores, it is possible to temporally separate the process of bonding the fibers (fiber adjustment) at the front ends from the process of forming the waveguides. As a result, not only can the process of adjusting and localizing the fibers be improved, but the process of generating the waveguide patterns as well. The materials can also be optimally adapted to the different processes. This makes it possible to avoid the problems associated with stress induced by temperature changes, such as tearing of the fibers, as manifested under known methods.

Foil covers which are cut to size, as in the example shown in FIG. 1, are no longer needed, because they can now be replaced with a molded, cover component produced by means of micro-pattern generation. The method according to the present invention is suited both for covers to be adhesively bonded, i.e., those that remain on the substrate component, as well as for strip-off covers. There is no need to manually cut the cover components to a very precise size, because they fit automatically and very precisely, with tolerances of a few $\mu$m, on the corresponding substrate component, since they originate by means of a modeling process from the same mask. The fundamental idea of this construction is to produce positive and negative matrices using a three-stage optical printing technique that employs nickel plating.

BRIEF DESCRIPTION OF THE DRAWINGS

FIG. 4 illustrates a first part of the optical printing technique employing nickel plating.

FIG. 5 illustrates a second part of the optical printing technique employing nickel plating.

FIG. 6 shows the surface of a silicon wafer for manufacturing waveguide components in accordance with the present invention.

DETAILED DESCRIPTION

Polymeric substrates for waveguide components are produced, for example, using 6×6 $\mu$m waveguide grooves and fiber-guidance grooves having an effective depth of 67 $\mu$m. Further processing of these grooves requires that they be adhesively bonded using a polymeric core material having a higher refractive index. To create a single-mode optical waveguide, the core material at the substrate surface must be pressed out at a thickness of less than 1 $\mu$m, it being necessary in this case not to disturb or destroy the passive fiber adjustment. The present invention provides a method for manufacturing an integrated, optical waveguide component that has an especially favorable waveguide bonding.

Figure 1:
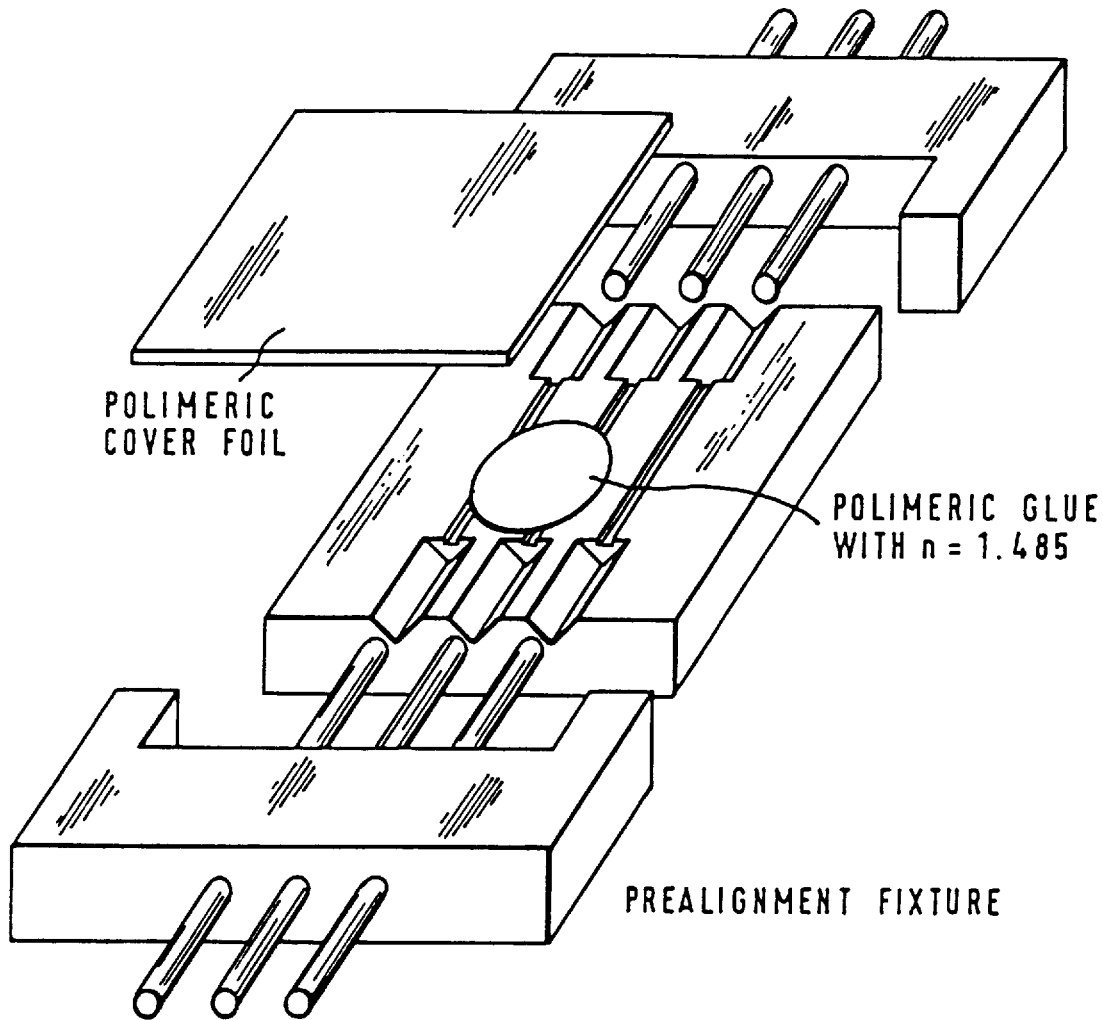
FIG. 1 shows a waveguide component according to the prior art.
Figure 2:
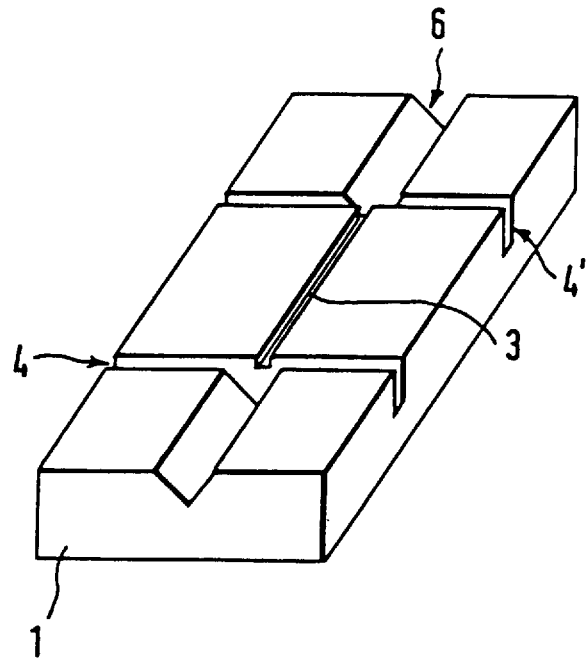
FIG. 2 illustrates a silicon master pattern for producing waveguide components in accordance with the present invention.
Figure 3:
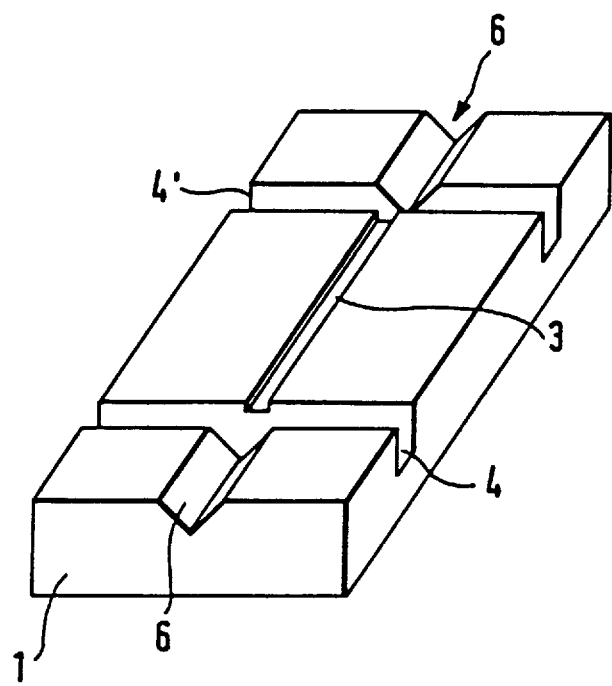
FIG. 3 shows a substrate component, similar in shape to the master pattern.

FIG. 2 depicts a silicon master pattern and FIG. 3 a substrate component 1, which can take the place of both a passive (only waveguide grooves) and an active (with embedded electro-optical components or heating electrodes) waveguide component. Besides V-guide regions 6 for the fiber couplings, waveguide pattern region 3 can be seen, which extends between two parallel grooves 4, 4' arranged essentially transversely to the fiber-coupling regions V-guides 6. All patterns with the exception of the saw cuts, which represent the grooves 4, 4', are generated on the master pattern (FIG. 2) using an exposure mask and are, thus, able to be reproduced very precisely. Since the saw cut traverses the entire silicon wafer and, in the direction of the cut, virtually does not deviate from parallel, the assumption can be made that the distance from saw cut to saw cut is always the same across the wafer.

FIGS. 4 and 5 elucidate the optical printing technique employing nickel plating. FIG. 4 shows first or third generations of nickel sheet acquired through electroforming, the nickel sheet being usable as a cover component 2 without the webs in the waveguide-pattern region. Webs 5, 5' correspond to grooves 4, 4' of substrate component 1 and mate with the grooves with an accuracy of fit during assembly.

FIG. 5 shows a second generation nickel sheet from which a strip-off cover of plastic can be formed.

The present invention renders possible three different constructional methods for manufacturing cover components produced by means of micro-pattern generation, all three being based on the same concept:

I. strip-off covers produced by means of micro-pattern generation in a first or third generation nickel sheet;

II. strip-off covers of plastic produced by means of micro-pattern generation, formed from a second generation nickel sheet; and III. a cover of plastic produced by means of micro-pattern generation and remaining on the substrate, formed from a precision-machined, second generation nickel sheet.

The present invention is based on the realization that first, second, and third generation nickel sheets are precise replicas of one another, with a degree of accuracy greater than $\mu$m, and are only differentiated from one another by a positive-negative conversion between two successive generations.

FIG. 6 illustrates a patterned silicon wafer having the following properties:

1) In all four visible cavitations (regions on a wafer containing a substrate or a cover component), what is known as the V-guide regions (above and below the saw cuts), as well as the deeper features (a cavitation area lies opposite the silicon surface on an about 200 $\mu$m high mesa, called "deeper feature", because the micro-pattern lies underneath the surface in the first or third generation nickel) are identical, since they were created by an electronically produced mask and by identical process steps.

2) Waveguide grooves are situated in the two inner cavitations, e.g., section B to B'; no waveguide grooves are situated in the two outer cavitations, e.g., section A to A'.

3) The two saw cuts run nearly perfectly in parallel across the entire wafer, even if the mutual clearance is not precisely defined (the tolerance is dependent upon the quality of the wafer saw).

Figure 7:
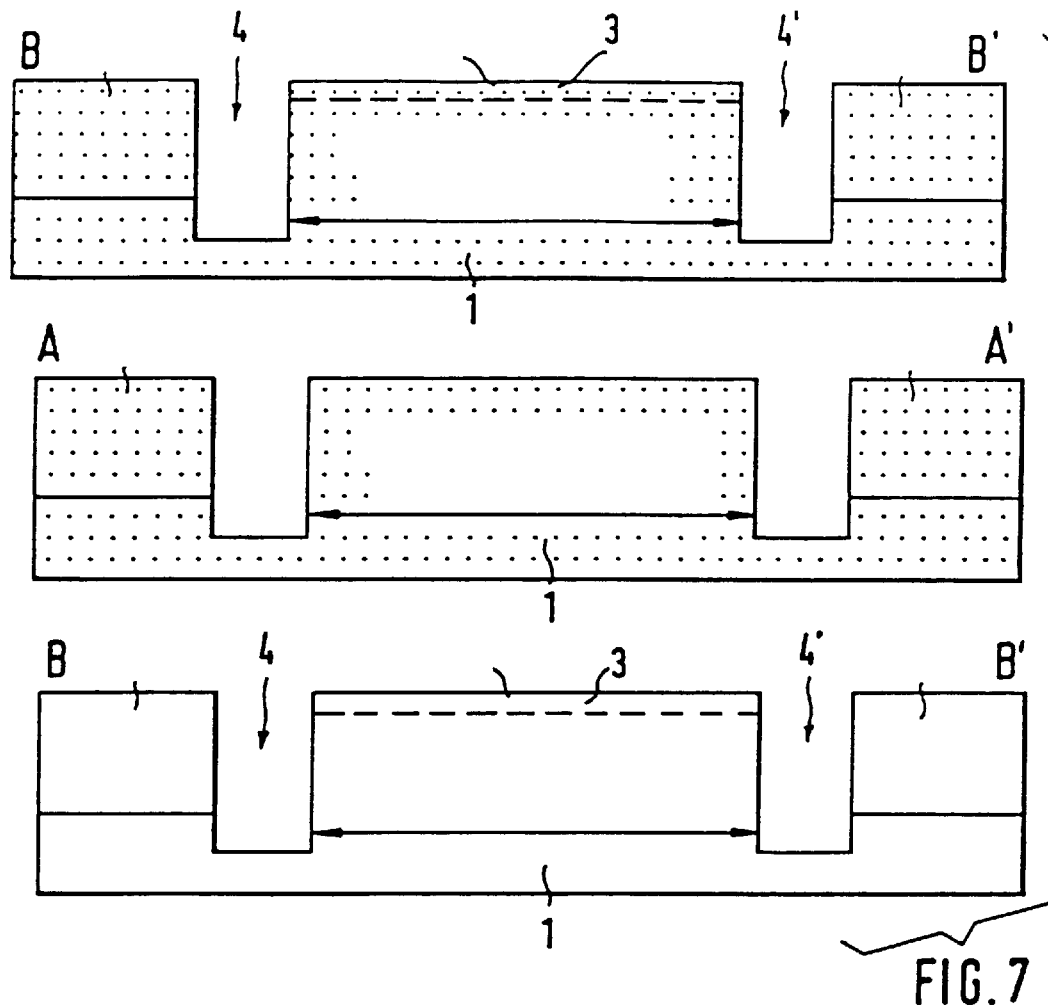
FIG. 7 depicts cross-sections through the silicon master pattern and through the substrate component.

In FIG. 7, one sees the consequence of the property named above under 3): the length "X", which indicates the distance from saw cut to saw cut in the silicon master in regions A, A' and B, B', as well as in the formed polymer substrate, is always the same. Merely the different thermal expansion properties of the metal and plastic produces a difference; however, this can be compensated through temperature adjustment.

Figure 8:
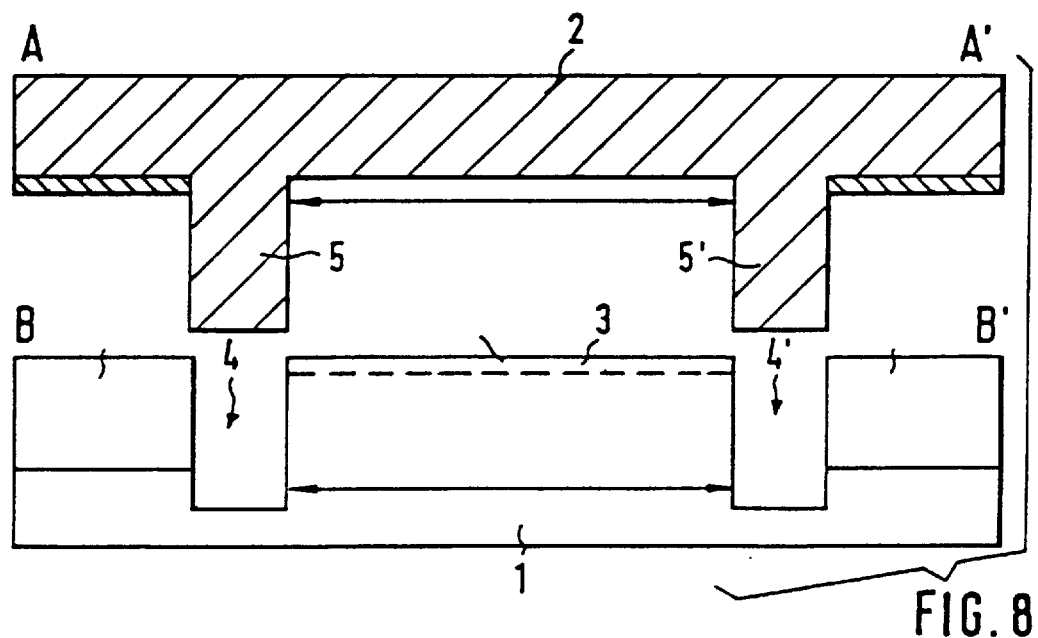
FIG. 8 illustrates a strip-off cover component being locked into place in a polymeric substrate.

FIG. 8 illustrates how, based on the described geometric proportions, a third generation nickel sheet that originated from the A, A' region locks precisely into place in the saw cuts of the polymer substrate. If, prior to assembly, one fills in core material (core monomer adhesive) between the strip-off cover and the substrate and polymerizes this core material following assembly, e.g. by supplying heat, then a waveguide is formed, given a correctly selected index of the core material, that extends from saw cut 4 to saw cut 4'. The strip-off cover leaves open the waveguide trenches. The fiber guidance grooves are not able to be filled with core material, since V-guide regions 6 of cover component 2 and of the substrate component are identical positive/negative copies, which rest on each other with precise form locking (webs 5, 5'), in particular given a high mechanical pressure and a thin chromium-plating of the nickel strip-off cover in V-guide region 6.

The processes of forming the waveguides in the pattern region and of coupling the fibers can be carried out as temporally separate processes. A material of high optical transmissivity is used for forming the waveguides, whereas a material that is highly resistant, particularly to shocks from temperature, can be used for coupling the fibers.

Figure 9:
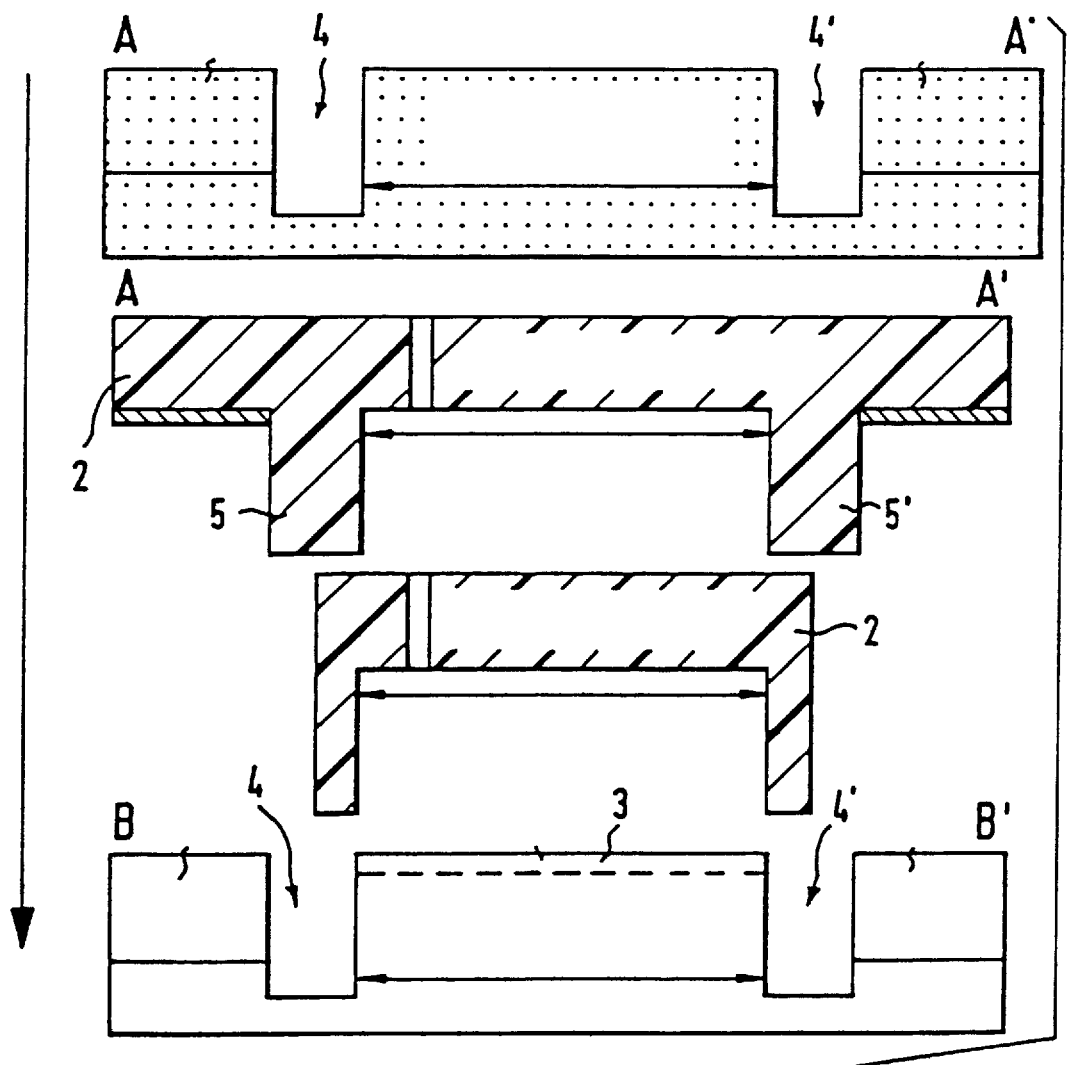
FIG. 9 shows a plastic strip-off cover component molded from a second generation nickel sheet.

The disadvantage associated with the constructional method I described above is the continuous use of an expensive micro-patterned nickel sheet as a strip-off cover. In particular, notches, through-holes, vias, etc. cannot be easily tested on the micro-patterned cover, because the strip-off cover of nickel is too valuable to risk modifications. In the case of constructional method II, as shown in FIG. 9, the strip-off cover is produced through plastic molding, e.g., by means of a thermoplastic molding, from a second generation nickel. This means that, apart from geometrical changes produced by varying thermal expansion between metal and plastic, the molded plastic part is geometrically identical to a third generation nickel strip-off cover and, therefore, can be used in the exact same way as the cover if the plastic material has been properly selected.

The advantage associated with constructional method II is the ability to produce virtually any desired quantity of strip-off covers using injection molding. Thus, in manufacturing, a separate cover component can be used for each substrate component, so that there is no need to clean the strip-off cover after each application. It is advantageous to chromium-plate the V-guide region with the aim of displacing the monomer out of this area, as in method I.

Constructional methods I and II each produce what is known as a strip-off waveguide, i.e., the waveguide core is initially situated unprotected at the surface of the polymer substrate and must, therefore, be protected with a polymer film in the next operational step.

Figure 10:
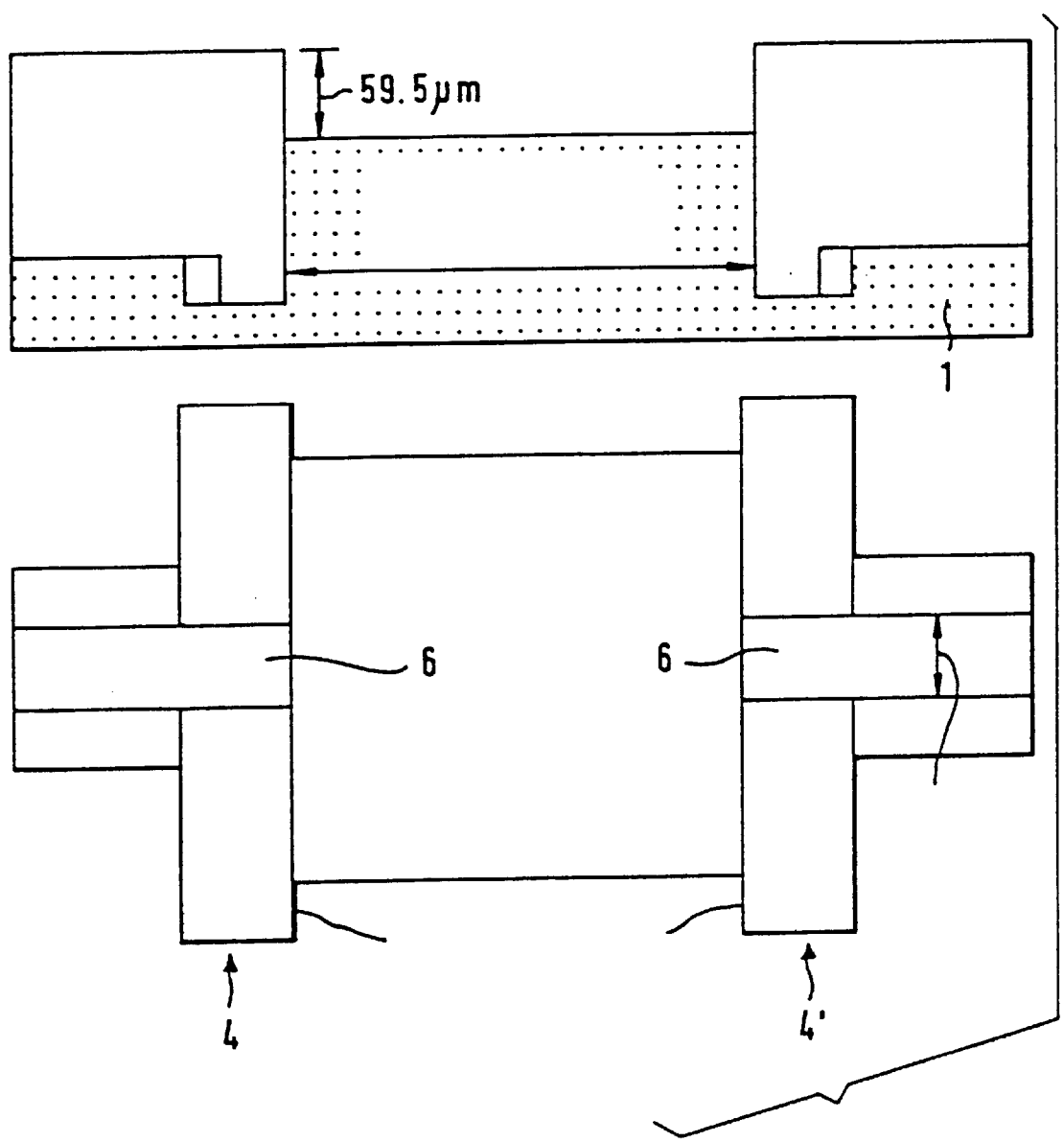
FIG. 10 depicts a mold insert for producing cover components by means of micro-pattern generation that remain on the substrate component.

The third constructional method III (illustrated in FIG. 10) likewise uses a micro-pattern cover. However, it is made of a plastic that is adhesively bonded by the core monomer to prevent later removal of the cover following waveguide production. Micro-pattern cover component 2 is formed in this case from a mold insert, which is able to be produced as follows: one starts out with a second generation nickel sheet, which is then modified by precision machining. The V-guide region, including saw cut 4, 4', is cut out from the corresponding third generation nickel sheet. This part is reworked so as to allow its width to correspond exactly to the width of the fiber band to be used later, thus, e.g., for an eight-fiber band to 2 mm. The part is fitted into the V-guide region of the second generation nickel sheet. Since both parts are inverse copies of one another, no gap remains in the saw cut of the second generation nickel sheet (see FIG. 10). The two parts are subsequently fixed in position, e.g., by means of spot welding. The mold insert is then reworked, e.g., by means of surface polishing so that, ideally, a 59.5 $\mu$m high step (FIG. 10) is formed. The covers, e.g. of PMMA, formed from the mold insert press the fibers into the V-guide region of the substrate and, at the same time, precisely seal off waveguide pattern region 3, without the need for additional precise sawing as under conventional methods.

The negative-positive forming can, of course, also take place in a reverse sequence. In that case, a cover component would be used as a basic primary form, and the substrate component would be formed from the basic primary form.

What is claimed is:

1. A method for manufacturing an integrated, optical waveguide component having fiber couplings, the method comprising the steps of:

forming a substrate component having at least one optical waveguide pattern;

introducing an optically conductive material into a first region including the optical waveguide pattern;

providing the substrate component with at least one groove, in a fiber-coupling region, running substantially transversely to the fiber-coupling region;

forming a cover component, having at least one web fitting into the at least one groove of the substrate component, from a mold of the substrate component without the optical waveguide pattern; and separating the optically conductive material from at least one second region of the substrate component spaced from the first region including the optical waveguide pattern by assembling the substrate component and the cover component such that the at least one web fits into the at least one groove.

2. The method as defined by claim 1, further comprising the step of:

producing, by a saw cut, at least two grooves running parallel to one another across the substrate component.

3. The method as defined by claim 1, further comprising the step of:

providing the substrate component with at least one form-locking V-guide region, outside of the first region, for accommodating at least one optical fiber leading to the optical waveguide pattern.

4. The method as defined by claim 1, further comprising the step of:

machining one of the cover component and the substrate component mold, with respect to the substrate component, so that an optical waveguide trench is formed in the first region between the substrate component and the cover component when assembled.

5. The method as defined by claim 1, further comprising the step of:

filling in, following assembly of the substrate component and the cover component by fitting the at least one web into the at least one groove, the first region with a core monomer adhesive which subsequently polymerizes to form an optical waveguide that extends from groove to groove.

6. The method as defined by claim 1, wherein the cover component is produced from one of a first generation and a third generation, micro-pattern-generated, molded nickel sheet.

7. The method as defined by claim 1, wherein the cover component is produced from a micro-pattern-generated plastic formed from a second generation nickel sheet.

8. The method as defined by claim 1, wherein the cover component is produced from a cover of plastic remaining on the substrate component, the cover of plastic being molded from a nickel sheet precision-machined to accommodate fibers.

9. The method as defined by claim 1, further comprising the step of:

introducing a core monomer adhesive, as an optically conductive material, into the first region.

10. The method as defined by claim 3, further comprising the step of:

providing the at least one V-guide region with a thin chromium layer which prevents an ingress of a core monomer adhesive.

11. The method as defined by claim 1, wherein a formation of optical waveguides in the first region and a coupling of fibers are carried out as separate processes.

12. The method as defined by claim 11, wherein a plurality of different materials are used for forming the optical waveguides in the first region and for coupling the fibers.

13. The method as defined by claim 12, wherein a high-optical-transmissivity material is used for forming the optical waveguides, and wherein a material that is highly resistant, particularly to shocks from temperature, is used for coupling the fibers.

14. The method as defined by claim 1, wherein a plurality of cover components are produced through multiple replication by at least one of electrodeposition and plastic engineering from a single master pattern having two traversing, mutually parallel saw cuts, a first cavitation for forming the substrate component being distinct from a second cavitation provided for the cover component solely by a plurality of waveguide trenches and webs.

15. The method as defined by claim 1, further comprising the step of:

producing a plurality of cover components through multiple replication of a master pattern by at least one of electrodeposition and plastic engineering, wherein a first cavitation provided for forming the plurality of cover components is distinct from a second cavitation provided for forming the substrate component solely by a plurality of grooves and webs, and wherein the plurality of grooves and webs are manufactured transversely to the fiber-coupling region by at least one of etching and another micro-mechanical technique so as assure that the plurality of grooves and webs fit together.

16. An integrated, optical waveguide component having fiber couplings, comprising:

a substrate component having at least one optical waveguide pattern region;

a cover component being a precisely-fitting corresponding negative replica of the substrate component, except at the at least one optical waveguide pattern region;

wherein the substrate component has at least one groove running substantially transversely to a fiber-coupling region in the substrate component, the at least one groove being fitted by at least one web in the cover component; and an optically conductive material in the at least one optical waveguide pattern region, the optically conductive material being separated, by the at least one groove and the at least one web, from the fiber-coupling region.

\* \* \* \* \*